United States Patent [19]

Burry et al.

[11] Patent Number: 4,993,139

[45] Date of Patent: Feb. 19, 1991

[54] SYSTEM FOR EXCHANGING TOOLS AND END EFFECTORS ON A ROBOT

[75] Inventors: David B. Burry, Westminster; Paul M. Williams, Lafayette, both of Colo.

[73] Assignee: The United States of America as represented by the United States Department of Energy, Washington, D.C.

[21] Appl. No.: 502,962

[22] Filed: Apr. 2, 1990

[51] Int. Cl.⁵ ............................................. B23Q 3/155
[52] U.S. Cl. ......................................... 29/568; 901/41
[58] Field of Search ...................... 29/568, 26 R, 26 A; 901/29, 41, 42, 30, 43; 414/729, 730; 294/86.4, 88

[56] References Cited

U.S. PATENT DOCUMENTS

| | | | |
|---|---|---|---|
| 4,046,263 | 9/1977 | Cwycyshyn et al. | 29/26 A |
| 4,520,550 | 6/1985 | Dunn et al. | 29/568 |
| 4,549,846 | 10/1985 | Torii et al. | 414/729 |
| 4,604,787 | 8/1986 | Silvers, Jr. | 29/568 |
| 4,615,101 | 10/1986 | Edwards et al. | 29/568 |
| 4,621,854 | 11/1986 | Boley et al. | 294/88 |
| 4,660,274 | 4/1987 | Goumas et al. | 29/568 |
| 4,679,297 | 7/1987 | Hansen, Jr. et al. | 29/568 |

*Primary Examiner*—William Briggs
*Attorney, Agent, or Firm*—Anne D. Daniel; James H. Chafin; William R. Moser

[57] ABSTRACT

A system and method for exchanging tools and end effectors on a robot permits exchange during a programmed task. The exchange mechanism is located off the robot, thus reducing the mass of the robot arm and permitting smaller robots to perform designated tasks. A simple spring/collet mechanism mounted on the robot is used which permits the engagement and disengagement of the tool or end effector without the need for a rotational orientation of the tool to the end effector/collet interface. As the tool changing system is not located on the robot arm no umbilical cords are located on robot.

12 Claims, 4 Drawing Sheets

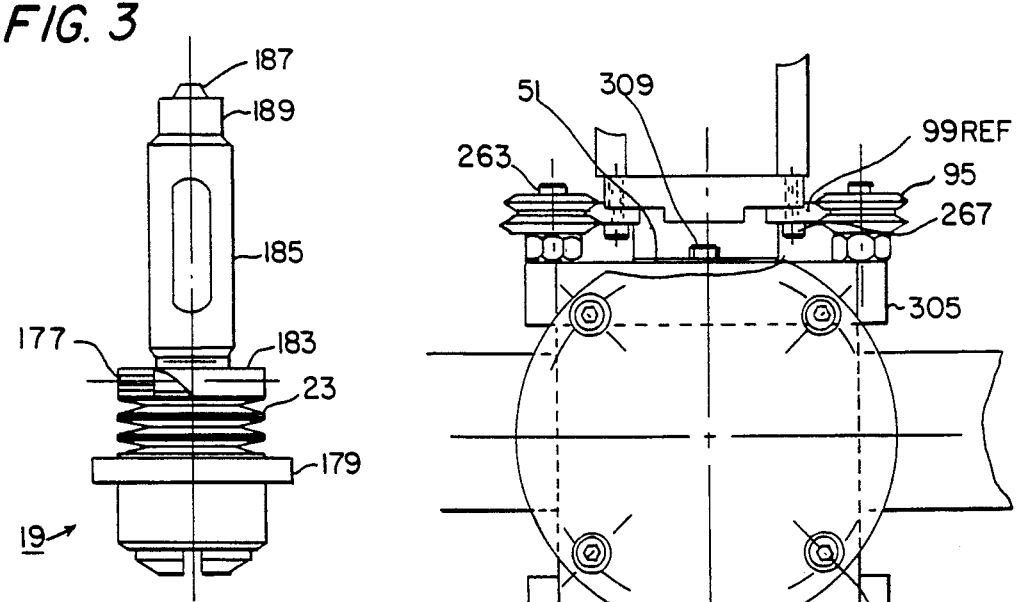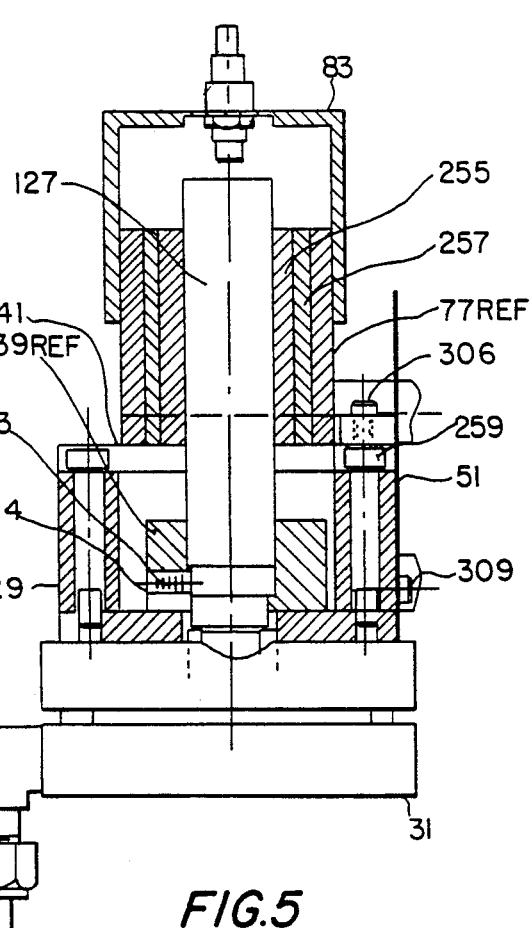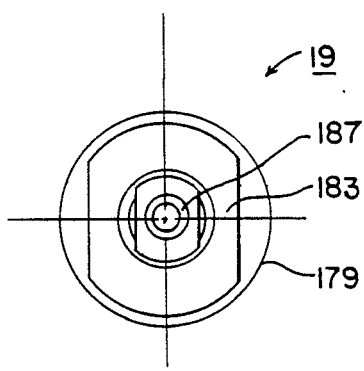

SYSTEM FOR EXCHANGING TOOLS AND END EFFECTORS ON A ROBOT

GOVERNMENT CONTRACT

The Government has rights in this invention pursuant to Contract No. DE-AC04-76DP03533 awarded by the U. S. Department of Energy to Rockwell International Corporation.

FIELD OF THE INVENTION

This invention relates to an automated system and method for exchanging tools and end effectors on a robot and is particularly adapted for use in an automated part brushing system (APBS) because it allows a robot to automatically exchange different brushes during the brushing cycle.

DESCRIPTION OF THE PRIOR ART

Robot arms have been developed which utilize a variety of tools. In order to avoid loss of production time associated with changing tools, automatic robotic tool changers have been developed. Some of the tools require "umbilical cords" to be attached to the tool changer which is typically located on the robot arm. These cords were subjected to the forces created by the movement of the robot arm and were subjected to excess wear and thus more likely to break off.

All robots are designed with a finite allowable load at the interface between the robot and end effector or coupling mechanism. This design load is taken up by the weight of the end effector and the forces required by the robot in the performance of its task. In the past, end effectors on robot structures have included specialized locking and unlocking devices which may utilize pneumatic, electrical, and/or mechanical means to engage and disengage an end effector. These devices have been built into or mounted on the robot structure, thus taking up part of the design load.

Cwscyshyn, et al., U.S. Pat. No. 4,046,263, shows an exchange mechanism for locking an end effector in place. This mechanism is mounted on a robot arm and has an air cylinder requiring an umbilical cord on the arm.

Dunn, et al., U.S. Pat. No. 4,520,550, shows a cam follower mechanism which adds to the weight of the robot arm. The robot wrist must be rotated to engage and disengage the end effector.

Torii, et al., U.S. Pat. No. 4,549,846, shows a complex changer unit which adds to the weight of the robot arm. A pressurized fluid is needed to activate the exchange, requiring an umbilical cord on the robot arm.

Silvers, U.S. Pat. No. 4,604,787, has a nipple and socket which become a part of the robot arm when the end effector is engaged. This adds to the weight (mass) of the robot. Rotation of the coupling is required to engage a special locking dog having an extension with a slot in the nipple ring.

Edwards, et al., U.S. Pat. No. 4,615,101, shows an exchange mechanism for locking an end effector in place. This mechanism is mounted on the robot arm and an umbilical cord on the arm cord is required to perform the tool exchange.

Boley, et al., U.S. Pat. No. 4,621,854, uses a drive mechanism to engage and disengage a hook which is mounted on a robot arm. This adds to the mass of the arm.

Goumas, et al., U.S. Pat. No. 4,660,274, has a drive mechanism located on a robot arm which is needed to open and close the arms and mounting brackets. This likewise adds to the mass of the robot arm.

Hansen, et al., U.S. Pat. No. 4,679,297, uses an air cylinder to open and close gripper arms. This air cylinder is located on the robot arm thereby adding to its mass. An umbilical cord located on the arm is required to perform the tool exchange.

In addition, certain of these mechanisms require the end effector on the robot arm to be in a certain angular position in order to accomplish the exchange.

What is desired is a robot tool exchanging system which does not add weight or mass to the robot arm, which does not require umbilical cords to be located on the robot arm, and which does not require a certain angular positioning of the coupling mechanism to complete the exchange.

An object of the present invention is to provide a tool exchange robot with low gripper mass.

A second object of the present invention is to provide such a tool exchange robot which does not require a rotational motion to engage the tool but which utilizes a linear motion to depress springs for tool engagement.

A further object of this invention is to provide such a tool exchange robot where the linear motion imparted to the robot arm is derived from a source other than the robot.

An even further object of this invention is to provide the tool with the ability to engage operation without the utilization of pistons, umbilical cords or gripper nipples.

An additional object of this invention is to provide a smaller robot which is able to perform the same task as larger previous robots.

SUMMARY OF THE INVENTION

The objects of the present invention are realized in a robot tool exchanger adapted for an automatic brushing system. The specific purpose of the robot tool exchanger is to allow the robot to automatically exchange two brushes during the process of brushing a part. This allows the robot to brush the part using two different styles of brushes.

This robot is designed with a finite allowable load at the interface between the robot and its end effector. This load is taken up by the weight of the end effector and the forces required to perform the robot's task. A brush changer assembly is made separate from the robot whereby a reduction in mass and weight carried by the robot is obtained. This allows for more of the allowable load to be used by the robot to perform its task. As a result, a smaller robot can be used to perform the same task a larger robot had previously been required to perform or the same robot can perform tasks requiring greater loads.

A brush gripper is located on the robot. The brush gripper is a collet utilizing disk springs to provide the force required to secure the tool to the robot.

The separate brush changer assembly utilizes a brush/collet interface. All umbilical cords are connected to this separate brush changer assembly located within reach of the robot and are not subjected to the dynamic forces of the robot movement.

The collet shaft can be hollow, thereby allowing air to be transferred into the end effector shaft when it is captured by the collet. Various grippers requiring air for operation can be exchanged. The strength of the robot to end effector connection is determined by the collet disk spring size and end effector shaft size.

The brush changer assembly is located within the robot work envelope. This assembly retains the brushes while not in use, opens and closes the brush gripper by collapsing and relaxing the disk springs, and sends signals back to the robot controller to ensure that the proper sequence is being followed.

DESCRIPTION OF THE DRAWINGS

The features, advantages and operation of the present invention will be readily understood from a reading of the following Detailed Description of the Invention in conjunction with the attached drawings in which like numerals refer to like elements and in which:

FIG. 3 is a face on view of the brush gripper assembly;

FIG. 3a is a plan view of the top of the brush gripper assembly;

FIG. 4 shows the brushing unit/force sensor subassembly of the robot in front view 1;

FIG. 4a is a detailed sectional view of the brushing unit/force sensor subassembly of the robot as seen along line 4a—4a of FIG. 1;

FIG. 4b is a side elevation of the sensor adapter taken along line 4b—4b of FIG. 4a;

FIG. 4c is a sectional view taken along line 4c—4c of FIG. 4a;

FIG. 5 is a sectional view taken at line 5—5 of FIG. 2; and

FIG. 6 is a partial sectional view of the brush changer assembly as seen along line 6—6 of FIG. 2b.

DETAILED DESCRIPTION OF THE INVENTION

Figure 1:
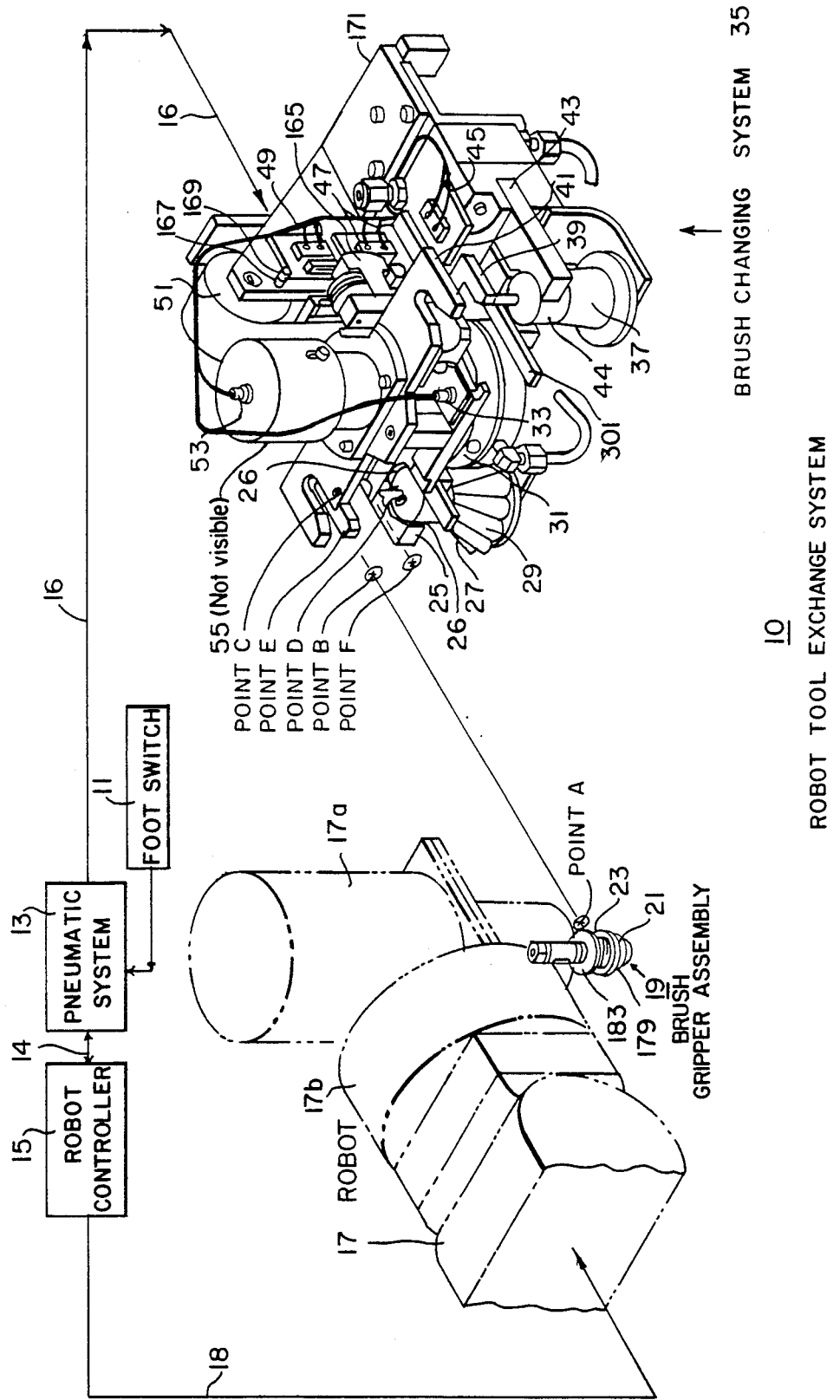
FIG. 1 is a block diagram of the operation of the robot tool exchange system which is comprised of a robot assembly and a brush changing system.

A robot tool exchange system 10, FIG. 1, wherein a robot tool exchange system allows a robot to automatically and alternately use two different types of brushes or tools during a programmed task is provided. The tool exchange system, being implemented with a brush changing assembly 35, is incorporated into the system 10, shown in FIG. 1.

The brush changing system, FIG. 1, has a robot work envelope, the region in which a robot 17 assembly is located and operates. The brush changing system assembly 35 interacts with this work envelope. An operator foot switch 11 is connected to send a signal to operate a pneumatic system control unit 13 for controlling gripper air cylinders. This pneumatic system control unit 13 is connected by electrical signal transmission lines 14 to a robot controller unit 15, which controller unit 15 has input/output capabilities for operating the robot assembly 17 and its attendant pneumatic valves. This pneumatic system control unit 13 provides pneumatic control signals 16 to the brush changing system 35 via pneumatic control lines 16 which are connected to a ram or pneumatic cylinder 31. Left-hand gripper 25 and a right-hand gripper 43 are located on the brush changing system 35.

The robot assembly 17, FIG. 1, is comprised of a brushing unit mounted on a force sensor subassembly 17b which is connected via electrical signal transmission lines 18 to the robot controller 15. The robot brushing unit includes a brush gripper assembly 19 and a motor assembly 17a connected to drive (rotate) the brush gripper assembly. The brush gripper assembly 19 holds and rotates any of a plurality of individual brush pins with a collet 21 operated by disk springs 23 which provide the force required to secure a brush pin to the robot motor 17a drive.

Figures 4, 4A, 4B, 4C:
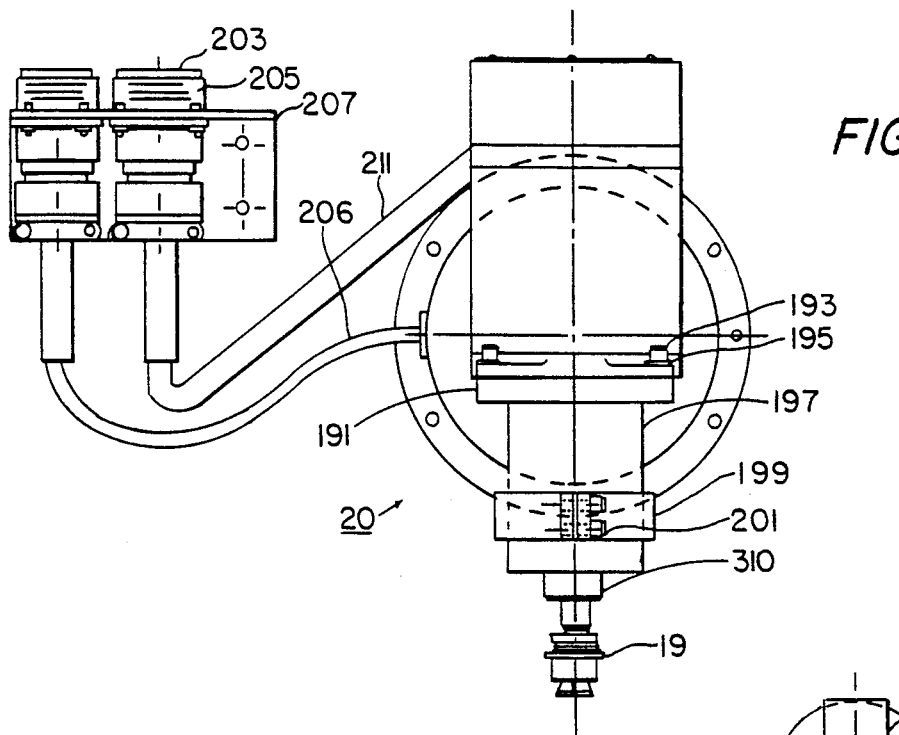

The brush gripper assembly 19 is secured to the output shaft 173 of a motor portion 191 of the robot 17 as shown in FIG. 4 and discussed further below. The shaft 310 and any attachments thereto are capable of rotating freely about 360 degrees.

Because the brush changing system 35 is separate from the robot assembly 17, the mass and weight carried by the robot 17 is reduced. This increases the allowable design load of the robot assembly 17 in performing its programmed task. This changes the power requirements for the robot motor assembly 17a and other structural members of the robot 17. Therefore, a smaller robot 17, including a smaller motor assembly 17a, can be used to perform a task which previously required larger equipment or, alternately, the same robot can perform tasks requiring greater power from composite robot/tool exchange assemblies.

The brush changing system 35, FIG. 1, retains the tools or brushes 29 and 37 while they are not in use and opens and closes the brush gripper assembly 19 by collapsing and relaxing disk springs 23 incorporated into the gripper 19 when a brush 29 or 37 is to be exchanged. The brush changing system 35 also sends signals back to the robot controller 15 to ensure that the proper sequence is being followed.

As all pneumatic umbilical cords are located on the brush changing system 35, they are not subjected to the forces created by the robot's 17 movements. The cords are therefore less likely to break. In addition, the robot 17 is permitted a greater freedom of movement because it is not encumbered by the pneumatic umbilical lines.

A left-hand brush gripper 25 and a right-hand brush gripper 43 each have an elongate slot 26, 44 respectively, which engages a respective brush 29, 37.

A switch actuator bar 27 and 301 is positioned adjacent each slot 26, 44. These actuator bars are pneumatically operated in conjunction with switches 45 and 55. An actuation sensor switch 55 or 45 adjacent the return position of the brush gripper 25 or 43 senses when the gripper 25 or 43 is in the open position.

A limit switch 33 operates with respect to the open position of a bottom clamp bar 39 which extends outwardly towards the robot assembly 17 to engage disk springs 23 and retract the collet 21 jaws. A limit switch 53 establishes the distance of actuation. This actuation movement is carried out pneumatically under the operation of the ram cylinder 31 which receives pneumatic power from the pneumatic system via line 16. This engagement of the disk springs is accomplished by the cooperation of the carriage 41 and a bottom clamp bar 39 positioned below the carriage 41.

Both the carriage 41 and the bottom clamp bar 39 include a pair of slots, with one slot of each pair being in alignment with one of the gripper slots 26, 44. The purpose of the carriage 41 and bottom clamp bar 39 slots is to engage the collet 21 and disk springs 23 in order to cause the release or engagement of a brush.

At the program start, no tools or brushes are in the brush changing system 35. An operator foot switch 11 is depressed. This sends a signal to the robot controller 15 to open a left-hand gripper 25 and a right-hand gripper 43 which are located on the tool changing system 35. The operator places a first tool 29 in the left-hand gripper 25 and a second tool 37 in the right-hand gripper 43. The foot switch 11 is again depressed. Both the left-hand gripper 25 and the right-hand gripper 43 clamp around the pin or body of a respective brush 29, 37, securing them in the brush changing system 35. The system 10 thereafter follows automatically a sequence of steps.

Referring again to FIG. 1, in order to pick up a tool 29, the robot assembly 17 moves within the robot work envelope from point A to point B, so that the robot 17 is directly in front of a U-shaped or slotted openings of the bottom clamp bar 39 and the carriage 41 of the brush changing system 35. The appropriate inputs are checked by the robot controller 15 to ensure that all switch settings are correct. Mechanical contact switches 33, 45, 47, 49, 53 and 55 are used to confirm the location of the components. Switch 33 verifies that the bottom clamp bar 39 is in the down position. Switch 53 verifies that the bottom clamp bar 39 is in the up position. Switch 55 verifies that the left-hand gripper 25 is open. Switch 45 verifies that the right-hand gripper 43 is open. Switch 47 verifies that the carriage 41 is in the down position. Switch 49 verifies that the carriage 41 is in the up position.

By confirming after each movement in the sequence by the robot 17 that switch 33, switch 53, switch 55, switch 45, switch 47 and switch 49 are in the correct modes, the robot controller 15 knows that the brush changing system 35 is ready to perform the next move. If the switch modes are found to be incorrect, the robot controller 15 will halt the program.

Once the robot controller 15 has confirmed that the switch modes are correct, it moves the robot 17 to point C so that the brush gripper 19 is moved inside the slotted, U-shaped opening of the bottom clamp bar 39 and the carriage 41. The ram cylinder 31 is energized and expands, moving the bottom clamp bar 39 upwardly, closing the gap between the bottom clamp bar 39 and the carriage 41. The bottom clamp bar 39 engages the taper clamp ring 179, shown in detail in FIG. 3, of the brush gripper assembly 19. A washer retainer nut 183, FIG. 3, of the brush gripper assembly 19 is caused to come into contact with the carriage 41 when the gap between the bottom clamp bar 39 and the carriage 41 is closed. This causes the disk springs 23 to collapse, thus allowing the diameter of the hole in the tool gripper assembly 19 to enlarge. The robot controller 15 checks the switch modes.

After the robot controller 15 has confirmed that the switch modes are correct, it moves the robot 17 downwardly to position D so that the brush gripper assembly 19 is placed over the shaft of the tool 29. When it moves, the robot 17 brings the carriage 41 with it, placing the carriage 41 in its down position. The downward movement of the carriage 41 is permitted by a constant force spring 51 which is supported by a camroll bearing 175, FIG. 2b, through which a shaft 173 extends. The constant force spring 51 provides a constant upward force on the carriage 41 at all times. The disk springs 23 remain collapsed and the diameter of the hole in the tool gripper 19 enlarged.

After the switch modes are checked by the robot controller 15, the ram cylinder 31 is deenergized. The bottom clamp bar 39 moves downwardly, enlarging the gap between the bottom clamp bar 39 and the carriage 41, allowing the disk springs 23 to expand. This causes the diameter of the hole in the tool gripper assembly 19 to decrease and clamp around the shaft of the tool 29. The brush 29 is now secure in the brush gripper assembly 19. Once the switch modes are checked by the robot controller 15, the left-hand gripper 25 is opened, releasing the tool 29 to the robot 17.

Mounted on the inner finger of the left-hand gripper 25 is a switch actuator bar 27. While the left-hand gripper 25 is in the open position, the carriage 41 is prevented from moving to its up position. This occurs when the switch actuator bar 27 contacts the clamp cylinder mount plate 135 attached to the ram cylinder 31. The switch modes are again checked by the robot controller 15.

The robot 17 is moved upwardly to point E. The carriage 41 is pulled up by the constant force spring 51 until it strikes a switch actuator bar 27. After the switch modes are checked, the robot 17 moves outwardly to point F so that it is directly in front of the tool changing system 35. The robot 17 is ready to perform its programmed task.

After the task has been completed, the robot 17 will return tool 29 to its storage position on the brush changing system 35. The robot 17 returns to point F. The robot controller 15 checks the switch modes. The robot 17 moves inside the brush changing system 35 to point E. The robot 17 moves down to point D bringing the carriage 41 down and off a switch actuator bar 27. The switch modes are checked by the robot controller 15.

Thereafter, the left-hand gripper 25 closes, gripping the housing of brush 29. The switch modes are checked by the controller 15. The ram cylinder 31 is energized, closing the gap between the bottom clamp bar 39 and the carriage 41, thus collapsing the disk spring 23 and enlarging the diameter of the hole in the brush gripper assembly 19. The grip on the shaft of brush 29 is released. The robot controller 15 then checks the switch modes and the robot 17 moves upward to point C.

Figure 2A:
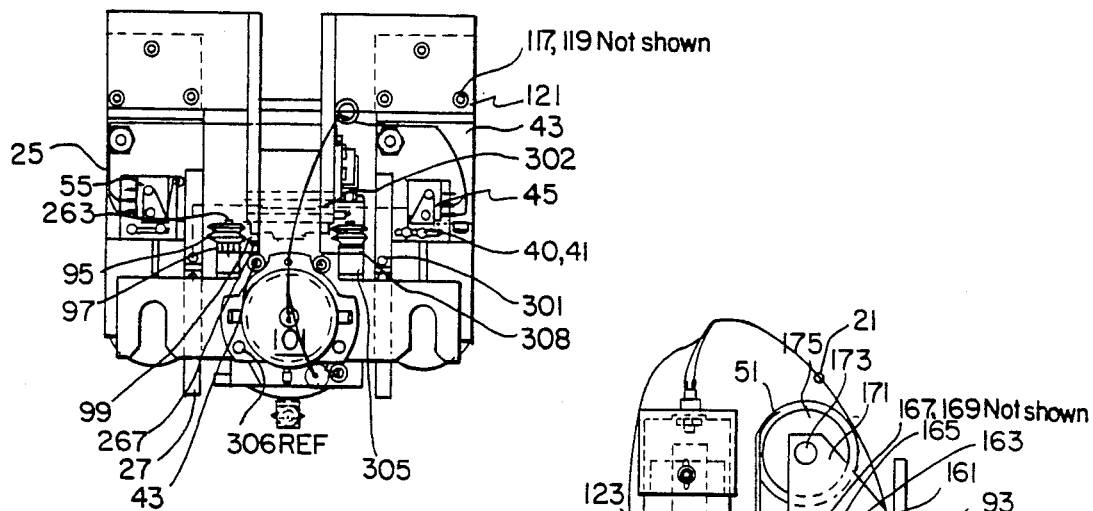
FIG. 2a is a plan view showing the top of the brush changing system of FIG. 1.
Figure 2B:
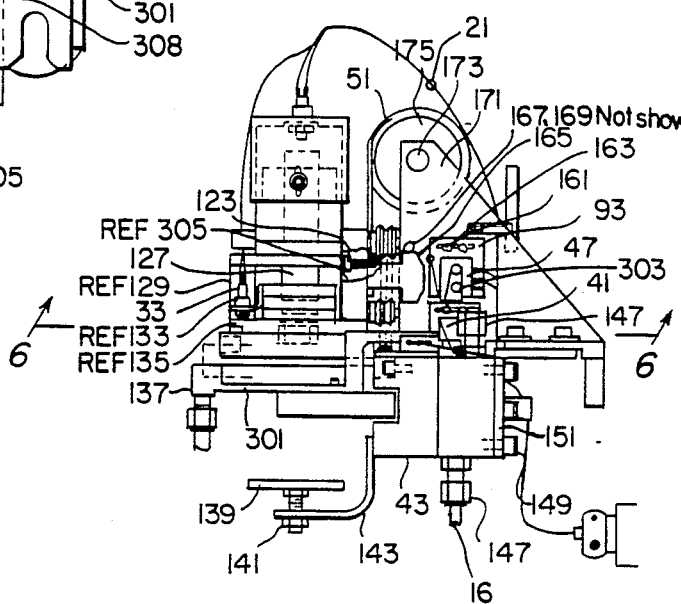
FIG. 2b is a side elevation of the brush changing system of FIG. 1.

The carriage 41 is pulled to the "up" position by the robot 17 and force of the constant force spring 51, FIG. 2b. A screw 169 and spacer 167 mounted to the system mount plate 171 contacts a switch actuator bar 165 mounted to the carriage 41, thereby preventing overtravel. The switch modes are then again checked by the robot controller 15. The ram cylinder 31 is then deenergized, opening the gap between the bottom clamp bar 29 and the carriage 41 and allowing the disk springs 23 in the brush gripper assembly 19 to expand. Once the switch modes are again checked by the robot controller 15, the robot 17 moves outwardly to point B. Brush 29 remains in the left-hand gripper 25 and the robot 17 can now move back to point A and resume its programmed task.

These pickup and return sequences can be, likewise, performed on the right side of the brush changer assembly 35 in order to accomplish the pickup and return of brush 37.

The brushes/tools 29 and 37 may be removed manually. The left-hand gripper 25 and right-hand gripper 43 may be spread apart and the brushes/tools 29 and 37 removed by hand. An over center device, such as a modified vice grip, may be used to collapse the disk springs 23 and release a tool 29 or 37 from the brush gripper assembly 19.

This system can be modified to perform the task of exchanging end effectors of various shapes and purposes.

The two distinct assemblies, the brush changing system 35 and the robot assembly 17 are located within the robot work envelope. The brush changing system 35 retains the brushes 29 and 37 while not in use, opens and closes the tool gripper 19 by collapsing and relaxing the disk springs 23 and sends signals back to the robot controller 15 to ensure that the proper sequence is being followed. Because the brush changing system 35 is separate from the robot assembly 17, a smaller robot can be used to perform the same task or the same robot can be used to perform tasks requiring greater loads, thus saving a considerable amount of money. In addition, because all umbilical cords are connected to the brush changing system 35, and are separate from the robot 17, therefore, the movements of the robot 17 are not restricted by these umbilical pneumatic cords nor are the cords subject to the forces created by the movements of the robot 17.

The brush changing system 35 is composed of four subassemblies. These are a mount plate subassembly, a right-hand brush subassembly, a left-hand brush subassembly and a carriage subassembly.

Figure 2:
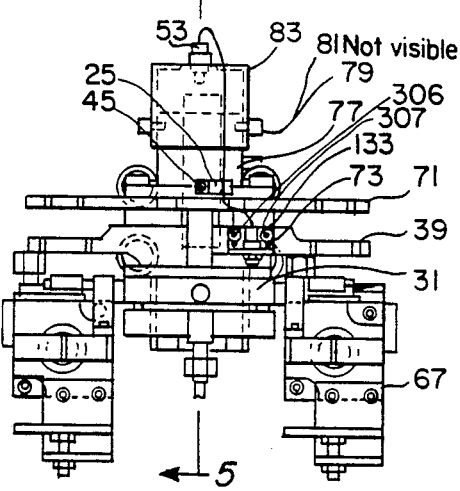
FIG. 2 is a front elevation of the brush changing system of FIG. 1.

Referring to FIGS. 2, 2a and 2b, a shaft 173 extends through the upper end of the mount plate 171. Camroll bearing 175 is mounted on the shaft 173 and constant force spring 51 is mounted to the camroll bearing 175. The shaft is held in place to the mount plate 171 by a set screw 302. Two modified guide tracks 99 are secured to the front of mount plate 171 with four screws 267 each. A screw 169 and spacer 167 are attached to mount plate 171. Switches 47 and 49 are mounted to switch adjustment bars 93 with two screws 303. The adjustment bars 93 are mounted to a mount plate 171 with lock washers 161 and screws 163.

At the bottom of the mount plate subassembly is a curved L-shaped brush height adjuster mount 143 attached by screws 67. On the horizontally extending arm of the mount 143 is a nut 141 and screw which have upon it a brush height adjuster 139. The mount extends downwardly from the face of a right-hand gripper 43. Behind the mount 143 are two pneumatic male connectors 147 that connect pneumatic lines 16 to the right-hand gripper 43 ports. Switch actuator bar 301 is mounted on the right-hand gripper 43. The brush holding cylinder mount 151 is attached to the back face of the right-hand gripper 43 by screws 149. The system mount plate subassembly is attached with screws 117 and flat washers 119 at the brush holding cylinder mount 151.

The left-hand brush subassembly is identical to the right-hand brush subassembly with the exception that the switch actuation bar 27, switch 55 and left-hand gripper 25 arms are mirror images.

Referring, now, to FIGS. 5 and 6, the stud 304 is retained in the bottom of the clamp bar 39 by set screw 253. The guide post 127 is pressed into the top of the bottom clamp bar 39. The ram cylinder 31 guide rod is attached to the threaded portion of the stud 304. A male pneumatic elbow 137 is mounted to the ram cylinder 31. The ram cylinder is attached to the clamp cylinder mount plate 135 by four screws 269. The top clamp bar 41 is secured to the clamp cylinder mount plate 135 by three shoulder screws 259. The front shoulder screw 259 passes through a spacer bar 129. The two other shoulder screws 259 pass through the clamp unit mount plate 305. The die set alignment fixture 77 is secured to the top of the clamp bar 41 by three screws 306. The bushing 257 is pressed into the die set alignment fixture 77. The straight guide post 127, rides up and down inside the bushing 257 which is retained by the ball bearing retainer 255. The switch adjustment collar FIG. 2 83 is secured to the die set alignment fixture 77 by two lock washers 79 and screws 81. Switch 53 is mounted on top of the adjustment collar 83. Switch mount 133 is secured to the bottom clamp bar 39 by two screws 306 and lock washers 307. Switch 33, FIG. 2b, is attached to the switch mount 133. The switch actuator bar 165, is secured to the clamp unit mount plate 305 by two screws 123. Two guide wheels 95 FIG. 2a and fixed adaptor bushings 308 are secured to the right-hand side of the clamp unit mount plate 305 by screws 263. Two guide wheels 95 and adjustable adaptor bushings 97 are secured to the left-hand side of the clamp unit mount plate 305 by screws 263.

The carriage subassembly, FIG. 6, mounts to the mount plate subassembly such that the guide wheels 95 ride up and down on the guide tracks 99. The constant force spring 51 is attached to the carriage subassembly at the lower back portion of the clamp unit mount plate 305 with screw 309.

Also located within the work envelope, yet distinct from the tool changer assembly, is the robot assembly 17 which includes a brushing unit 20 and a force sensor subassembly, shown in FIGS. 4 and 4a. The brushing unit 20 has a motor assembly 191 and subassembly 211 and a brush gripper assembly 19.

The motor assembly 191 is located on the robot arm. Downwardly extending from the motor assembly 191 and secured thereon by a four screws 193 and lock washers 195 is a body portion 197 which surrounds the brush gripper subassembly, FIG. 4a, which is mounted on a shaft 271.

Surrounding the shaft 271 are retaining rings 213, 221, 225, washers 215, 223 and MRC bearings 217, 219 which allow for free rotation of the shaft 173 and attached tools about 360 degrees of rotation. It is within this shaft 271, but outside the body portion 197, that the brush/tool gripper assembly 19 is mounted. The body portion 197 is held securely in place by a clamp ring 199 which is screwed 201 in place.

The tool gripper assembly 19, FIG. 3 and 3a, is a specifically designed collet which utilizes disk springs 23 to provide the force required to close the collet jaws to secure a brush/tool to the robot 17. A tool gripper shaft 187 has a spring 227 which extends within the shaft 271. The tool gripper assembly 19 has a bushing retainer nut 189 below this gripper assembly shaft 187 attached to a modified bushing 185. Below this is a washer retainer nut 183, having within it a roll pin 177. Located above a taper clamp ring 179 and below the retainer nut 183 are washer associated springs 23.

The collet shaft 187 can be hollow, allowing air to be transferred into the end effector shaft when it is captured by the collet 19. Various grippers requiring air for operation can be exchanged. The number of different end effectors/brush or tool pins is limited only by the number of gripper assemblies placed within the reach of the robot 17. The strength of the mechanical connection between the robot and the end effector/brush/tool is determined by the collet disk spring 23 and the effector/brush/tool shaft size.

No rotational orientation of the tool/collet interface is required. The collet 19 can be rotated to any position without affecting the exchange. If orientation is desired, the collet 19 can be secured to the robot 17 so that it will not rotate.

Within the modified bushing 185 FIG. 4a is an opening in which an insert 229 may be placed. This insert 229 is held in place by a brush or tool holding screw 231 and secures the tool gripper assembly 19 so that it will not rotate. Thus, the end effector/tool/brush can be rotated indefinitely or made to maintain orientation.

Located next to the brushing unit 191 et seq is the force sensor subassembly, 209, FIG. 4a. Mounted on the end of that subassembly 209 is an ASTEK force sensor adapter 241 FIG. 4b which is secured with a dowel pin 243 and screws 245.

Between the brushing unit 191 et seq and force sensor subassembly 209 is a wire brush adapter plate 235 FIG. 4a and 4c. This is placed within the clamp ring 201 and secured against the brushing unit by a screw 237 and lock washer 239. The opposite end of adapter plate 235 is secured by a dowel pin 247 and screw 249. The motor power cord 211 and force sensor signal cord 206 is attached to an electrical mount 207 by a screw 203 and nut 205.

The above described structure provides a system which implements a method for exchanging brush tools and end effectors on a robot and provides for such an exchange during a programmed operational task for the robot. As the exchange mechanism is located off the robot, the total mass of equipment on the robot arm is reduced and permits the use of smaller robot support arms and smaller robot drive motors to perform identical designated tasks to those previously accomplished. Further, as the tool changing structure is not located on the robot arm, this robot structure is free of the pneumatic umbilical cords normally employed with tool changing structures.

While a simple spring/collet mechanism is mounted on the robot and used to engage, hold and drive the tool, other types of structures may be substituted and still be within the intent and scope of this invention.

It is intended that the above description be read as illustrative of the invention. Features may be added to the invention and variations may be made on the structure described and still be within the intent and scope of the present invention. The invention is not to be limited by the above description.

What is claimed is:

1. A robot system having automatic exchange of tools on a robot structure, said exchange being effected by a mechanism apart from said robot structure thereby freeing said robot of the exchange structure and reducing robot mass, comprising:
   a tool gripper assembly extending from said robot structure;
   a tool changing device for actuating said tool gripper and placing a tool in said tool gripper and extracting it therefrom, wherein said tool changing device is separate from said robot structure and is located within the reach of said robot;
   a pneumatic system connected to operate and power said tool changing device and to provide signals of the operation thereof;
   an operator control switch connected to operate said pneumatic system; and
   a robot controller unit connected to receive signals from said pneumatic system and connected to said robot structure to control the operation thereof.

2. The robot system of claim 1 wherein said tool gripper assembly includes a spring biased collet structure.

3. The robot system of claim 2 wherein said collet structure includes a shaft, a collet jaw mechanism mounted on said shaft, a pair of retaining washers positioned on said shaft adjacent said collet jaws, and a disk spring structure positioned between said retaining washers forcing one of said washers to close said collet jaws.

4. The robot system of claim 1 wherein said tool changing device includes:
   at least one tool gripper assembly engagement device, said device causing said tool gripper to disengage a tool when said engagement device is in contact therewith;
   a tool holding device positioned adjacent said engagement device, said holding device being capable of holding a tool to be gripped or to be released from said tool gripper assembly;
   pneumatic operation means connected to said pneumatic system for selectively operating said engagement device and said tool holding device under the control of said pneumatic system; and
   a plurality of sensor means for sensing the location and operation of said tool gripper assembly, said engagement device and said tool holding device, said sensor means being positioned adjacent said engagement device and said tool holding device.

5. The robot system of claim 4 wherein tool gripper assembly includes a collet-type jawed gripper device, having a spring biasing said jaws to a closed position.

6. The robot system of claim 5 wherein said engagement device includes a left hand and a right hand gripper bars, each said gripper bar containing an elongate slot, said slot being of a size and shape to engage said biasing spring of said tool gripper assembly.

7. The robot system of claim 6 wherein said tool holding device includes an elongate carrage bar having a pair of elongate slots, one each adjacent one of said gripper bar slots.

8. The robot system of claim 7 wherein said tool holding device also includes a switch actuator bar in alignment with and adjacent to said carriage bar and said gripper bar.

9. The robot system of claim 8 wherein said plural sensor means include a plurality of switches attached to and operatable to sense the position of said carriage bar, said gripper bar and said collet structure is within said carriage bar and within said gripper bar slot.

10. A system for automatic exchange of end effectors on a robot, comprising:
    a robot having located thereon a collet mechanism having disk springs to close said collet mechanism to secure an end effector to thereto;
    an end effector changing device adjacent to but separate and distinct from said robot and having means to actuate said collet mechanism;
    a pneumatic system unit connected to pneumatically operate said end effector changing device; and
    a robot controller having input/output capabilities and being electrically connected to operate said robot, said robot controller being connected to said pneumatic system unit.

11. The system of claim 10 wherein said collet mechanism includes a hollow shaft, said hollow shaft being connected to said pneumatic system unit.

12. The system of claim 11 wherein said pneumatic system unit monitors the presence of an end effector on said collet mechanism through said hollow shaft connection.

* * * * *